United States Patent
Taylor et al.

(10) Patent No.: US 7,949,122 B1
(45) Date of Patent: May 24, 2011

(54) METHOD AND APPARATUS FOR DETERMINING WAIT TREATMENT OF A CUSTOMER IN A CALL CENTER

(75) Inventors: Robin Donald Taylor, Contra Costa, CA (US); Robert Wayne Snyder, Danville, CA (US)

(73) Assignee: Avaya Inc., Basking Ridge, NJ (US)

( * ) Notice: Subject to any disclaimer, the term of this patent is extended or adjusted under 35 U.S.C. 154(b) by 1253 days.

(21) Appl. No.: 11/582,609

(22) Filed: Oct. 18, 2006

(51) Int. Cl.
*H04M 3/00* (2006.01)
*H04M 5/00* (2006.01)

(52) U.S. Cl. ......... 379/265.02; 379/265.08; 379/266.08; 379/266.1

(58) Field of Classification Search ............. 379/265.02, 379/266.08, 266.1, 266.01, 265.08
See application file for complete search history.

(56) References Cited

U.S. PATENT DOCUMENTS

| | | | | |
|---|---|---|---|---|
| 5,278,898 A | * | 1/1994 | Cambray et al. | 379/266.1 |
| 5,684,872 A | * | 11/1997 | Flockhart et al. | 379/266.08 |
| 7,068,775 B1 | * | 6/2006 | Lee | 379/265.02 |

* cited by examiner

*Primary Examiner* — Thjuan K Addy
(74) *Attorney, Agent, or Firm* — Chapin IP Law, LLC; David W. Rouille, Esq.

(57) ABSTRACT

A method, apparatus and computer program product for determining wait treatment for a customer in a call center is presented. Information relating to a customer in a communication session with the call center is recorded. The information relating to a customer in a communication session with the call center is then evaluated. From the evaluation the type of wait treatment to use for the customer is determined and is provided to the customer.

16 Claims, 3 Drawing Sheets

METHOD AND APPARATUS FOR DETERMINING WAIT TREATMENT OF A CUSTOMER IN A CALL CENTER

BACKGROUND

Call centers are systems in which a person can communicate to receive information. Such communication can include, but is not limited to, telephone calls, Internet access, email, and FAX. A call center can include one or more interactive voice response (IVR) systems. The one or more IVRs provide automatic branching voice queries to which the caller responds with button pushes on a telephone keypad or with voice responses on a telephone. The call center may be provided having only the one or more IVR systems, or alternatively, it is also provided having human agents. For example, at the end of the IVR branching voice queries, the caller can be directed to press zero to speak to an agent. The call center can also include one or more database server computers, one or more database storage areas, one or more web server computers, and one or more email server computers.

SUMMARY

Conventional mechanisms such as those explained above suffer from a variety of deficiencies. One such deficiency is that in conventional call centers, during peak periods when there is a high volume of incoming contacts and a shortage of agents, it is often necessary to put customers into "wait treatment." Some customers become impatient in wait treatment and abandon the contact. Such abandoned contacts are costly to the business.

Embodiments of the invention significantly overcome such deficiencies and provide mechanisms and techniques that record information about the customer's experience with self-service and use the information to determine what type of wait treatment to invoke (if any). If wait treatment is necessary for these customers, it makes sense to provide them some way to feel that they are engaged in a contact so they are less likely to abandon the contact. New information is required to facilitate the wait treatment determination. This new information includes the number of previous abandons for this customer, which is utilized as a component of the methodology that determines what type of wait treatment to use, or to raise the priority of the contact to see that the customer gets to an agent faster. Particular embodiments of the presently disclosed method and apparatus for determining wait treatment of a customer in a call center adds logic to the contact routing methodology to determine if the abandon history this customer has had with the business warrants routing to a specific type of wait treatment or raising the priority of the contact. The abandon history for the customer is collected from the customer's previous contacts with the business.

In a particular embodiment of a method for determining wait treatment for a customer in a call center, the method includes recording information relating to a customer in a communication session with the call center and evaluating the information relating to a customer in a communication session with the call center. The method further includes determining a type of wait treatment to use for the customer based on the evaluating the information relating to a customer in a communication session with the call center and providing the determined type of wait treatment to the customer.

Other embodiments include a computer readable medium having computer readable code thereon for determining wait treatment for a customer in a call center. The medium includes instructions for recording information relating to a customer in a communication session with the call center and instructions for evaluating the information relating to a customer in a communication session with the call center. The computer readable medium further includes instructions for determining a type of wait treatment to use for the customer based on the evaluating the information relating to a customer in a communication session with the call center, and instructions for providing the determined type of wait treatment to the customer.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of determining wait treatment of a customer in a call center as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of determining wait treatment for a customer in a call center as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
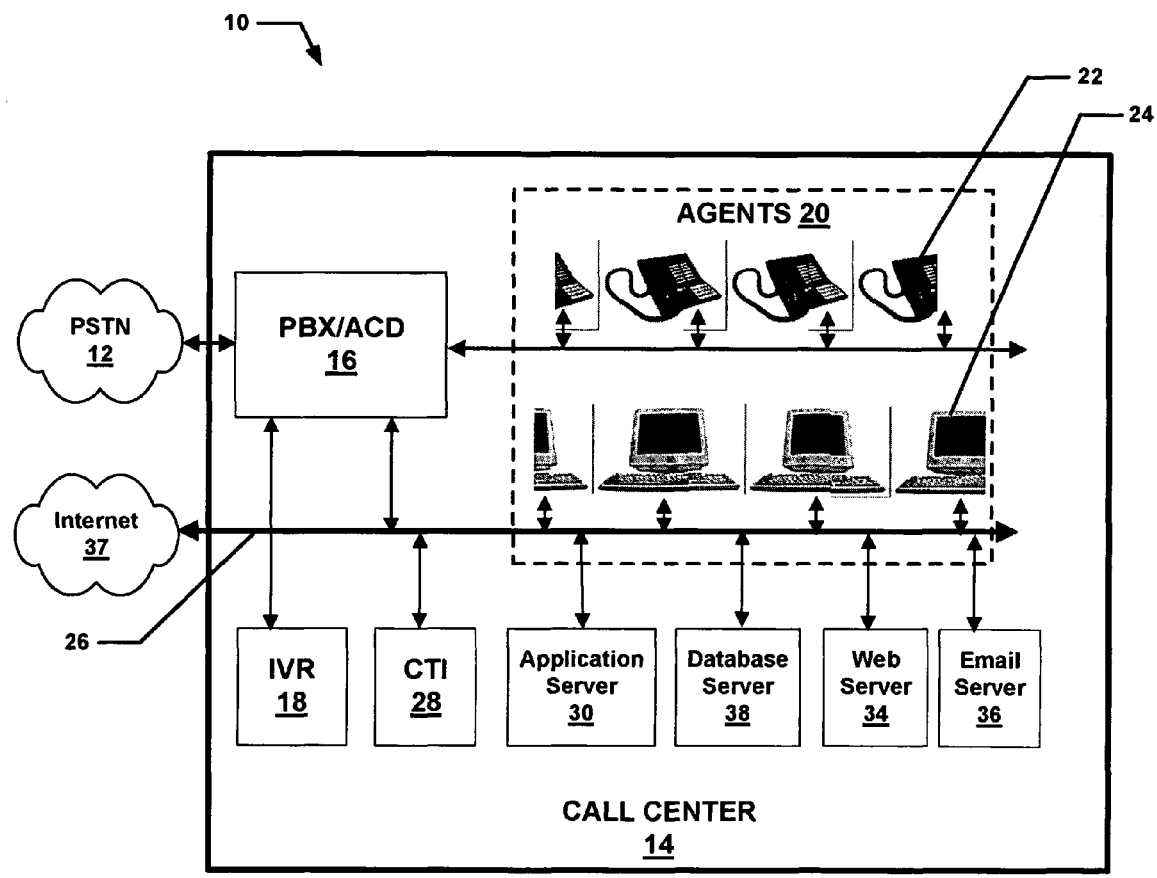
FIG. 1 illustrates a block diagram of a call center that determines wait treatment for a customer in accordance with certain embodiments of the invention.

Referring now to FIG. 1, a call center environment 10 is shown. The call center 10 is connected to the public switched telephone network 12 (PSTN). The PSTN is a worldwide telephone system that provides telephone call connections, including telephone connections to the call center 14. The call center 14 can include a private branch exchange 16 (PBX) usually combined with an automatic call distributor 16 (ACD). The PBX 16 is a sub-system that can route incoming telephone calls to intended call recipients, or agents. The ACD is a sub-system that can provide call queuing and automatic wait handling of incoming telephone calls. The PBX/ACD 16 can be coupled to one or more interactive voice response systems 18 (IVR). The IVR 18 comprises a system that provides voice queries to a telephone caller. Voice queries typically direct the telephone caller through a series of selections that can be chosen by the telephone caller via button pushes on the telephone keypad.

Within the IVR queries, the telephone caller can be directed by the IVR 18 to select an option that connects the telephone caller, via the PBX/ACD 16, to one of a group of agents 20. The agents 20 can have access to agent telephones, of which agent telephone 22 is representative of all agent telephones. The agents 20 can also have access to agent computers, of which agent computer 24 is representative of all agent computers.

The PBX/ACD 16 is further coupled to a network 26 that can be provided to couple together the PBX/ACD 16, the agent computers, for example agent computer 24, a computer telephony integration (CTI) server 28, an application server 30, a database server 32, a web server 34, and an email server 36. The network 26 can correspond, for example, to an Ethernet local area network.

The IVR 18 can, among the IVR selections offered, request that the telephone caller enter "identifying information," for example an account number, by button pushes on the telephone keypad or by voice responses from the telephone caller. Identifying information can also be automatically provided by the PBX/ACD 16 without entry by the telephone caller with a variety of methods, including dialed number identification service (DNIS) and automatic number identification (ANI). The identifying information is passed through the PBX/ACD 16 to the bus 26. The CTI 28 receives the identifying information and coordinates the identifying information with "caller data," for example account history associated with the telephone caller, contained in the database server 32. An application program in the application server 30 can automatically provide a display of the caller data in a "screen pop" to the agent disposed upon the agent computer 24. Alternatively, the application program can reside within the agent computer 24.

The call center 14 can also be accessed via the Internet 37, for example by a web user who accesses a web page associated with the call center. The web user, via the Internet 37, connects to the web server 34 for web page access. The web user can also be an email user, in which case the email user connects to the email server 36 via the Internet 37. While web page access and email access have been described herein, the invention is not limited to only these specific Internet applications. A variety of Internet applications can access a variety of servers within the call center 14.

Attracting and retaining customers in a cost effective way is a high priority for businesses that use contact centers as a means of communicating with their customers. One way to achieve this is by reducing the number of abandoned contacts for repeat customers by using their previous behavior to determine their proclivity to abandon while in wait treatment and route their current contact to a wait treatment that makes the customer less likely to abandon. During peak periods when there is a high volume of incoming contacts and a shortage of agents, it is often necessary to put customers into "wait treatment." Some customers become impatient in wait treatment and abandon the contact. Such abandoned contacts are costly to the business. For customers that frequently contact a business, it is desirable to use their past history of abandoning in wait treatment to determine what type of wait treatment to invoke (if any) for this particular customer. If wait treatment is necessary for these customers, it makes sense to provide them some way to feel that they are engaged in a contact so they are less likely to abandon (e.g., providing the customer with music, advertisements and the like). New information is required to facilitate the wait treatment decision: the number of previous abandons for this customer should be a component of the methodology that determines what type of wait treatment to use, or raising the priority of the contact to see that the customer gets to an agent faster.

Attracting and retaining customers in a cost effective way is a high priority for businesses that use call centers as a means of communicating with their customers. By way of certain embodiments of the present method and apparatus for determining wait treatment of a customer in a call center, additional information is used by contact routing application to determine if the abandon history this customer has had with the business warrants routing to a specific type of wait treatment or raising the priority of the contact. The abandon history is collected from the customer's previous contacts with the business. The routing methodology incorporates this additional information to interpret the customer's behavior and proclivity to abandon in wait treatment. The methodology could determine to route the customer to a wait treatment that is more likely to keep the customer engaged or raise the priority of the contact so that the customer experiences less wait time.

Figure 2:
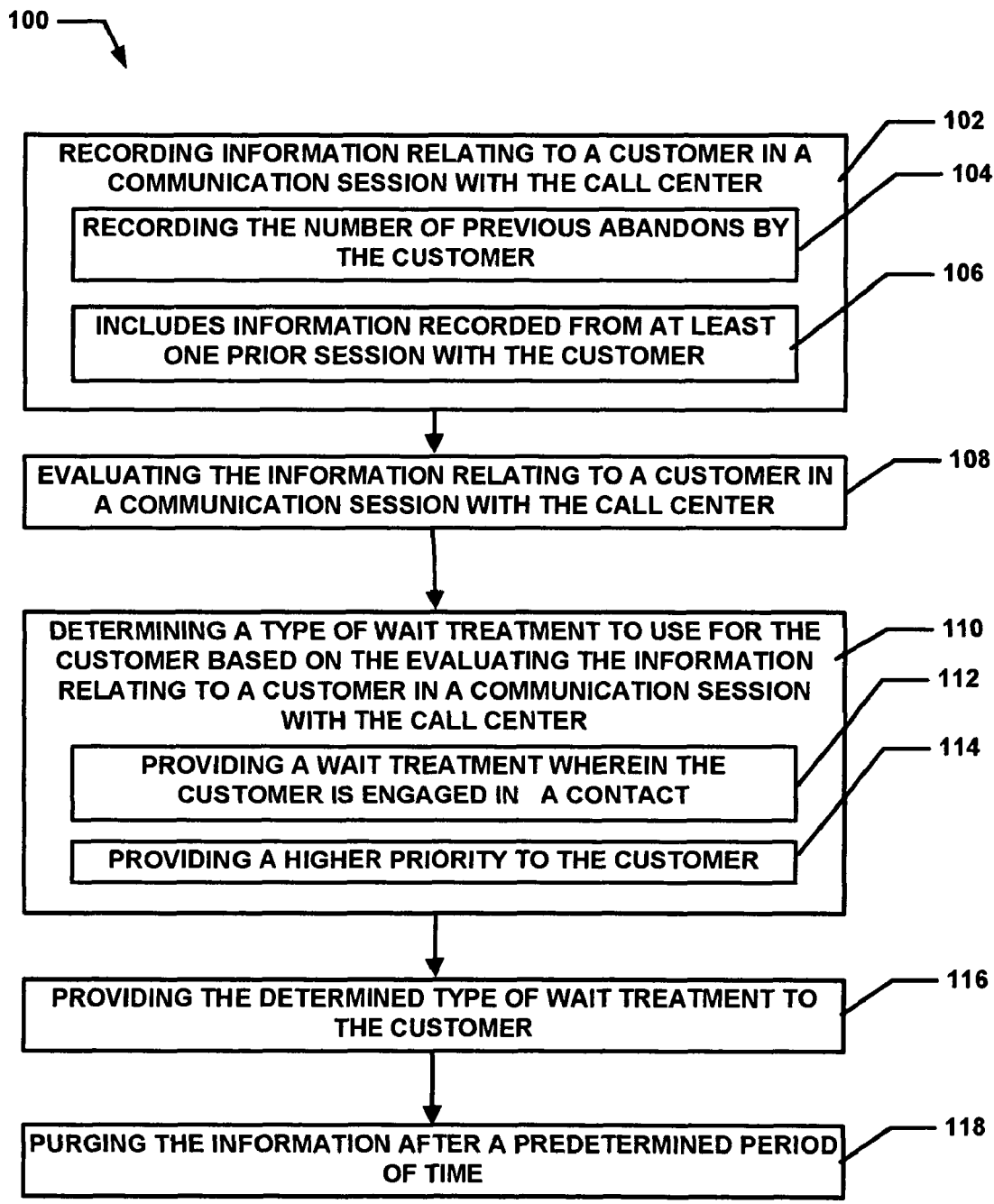
FIG. 2 depicts a flow diagram of a particular embodiment of a method of determining wait treatment for a customer in a call center.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order. In a particular embodiment, the method 100 begins with processing block 102, which states recording information relating to a customer in a communication session with the call center. As recited in processing block 104 this may include recording the number of previous abandons by the customer. As further recited in processing block 106 this may also include information recorded from at least one prior session with the customer. In such a manner a history of customer interactions with the call center is provided.

Processing continues with processing block 108, which discloses evaluating the information relating to a customer in a communication session with the call center. Processing block 110 states determining a type of wait treatment to use for the customer based on the evaluating the information relating to a customer in a communication session with the call center. As recited in processing block 112, this may include providing a wait treatment wherein the customer is engaged in a contact. As also recited in processing block 114 this may include providing a higher priority to the customer.

Processing continues with processing block 116, which discloses providing the determined type of wait treatment to the customer. Thus, the customer may be provided a wait treatment wherein the customer is engaged in a contact (e.g., music playing) or the customer may have their priority increased so they end up spending less time waiting.

Processing block 118 states purging the information after a predetermined period of time. This is done so that the determination of the type of wait treatment to apply is based on recent customer interaction with the call center.

As an example, suppose a customer calls in to a call center of a computer manufacturer regarding a problem the customer is having with his/her computer system. The prior history of this particular customer indicates this customer does not like to be put in a wait treatment and when put into a wait treatment, typically abandons the contact and calls back at another time. This scenario is problematic in that the customer does not feel he/she is being helped quickly enough, and further that a later call back by the customer involves a new set of people being involved and additional record keeping, as well as affecting the wait time of other customers who may also be calling in to the call center. By way of the present invention, the caller is identified, based on the customer's prior history with the call center, as a caller who does not like to be put into a wait treatment and the customer is given a different wait treatment wherein the customer may be engaged (e.g., music being played or the like). The customer (additionally or optionally) may be given a higher priority in the wait queue such that the amount of time the are in a wait treatment is reduced, hopefully such that the customer does not abandon the contact.

Figure 3:
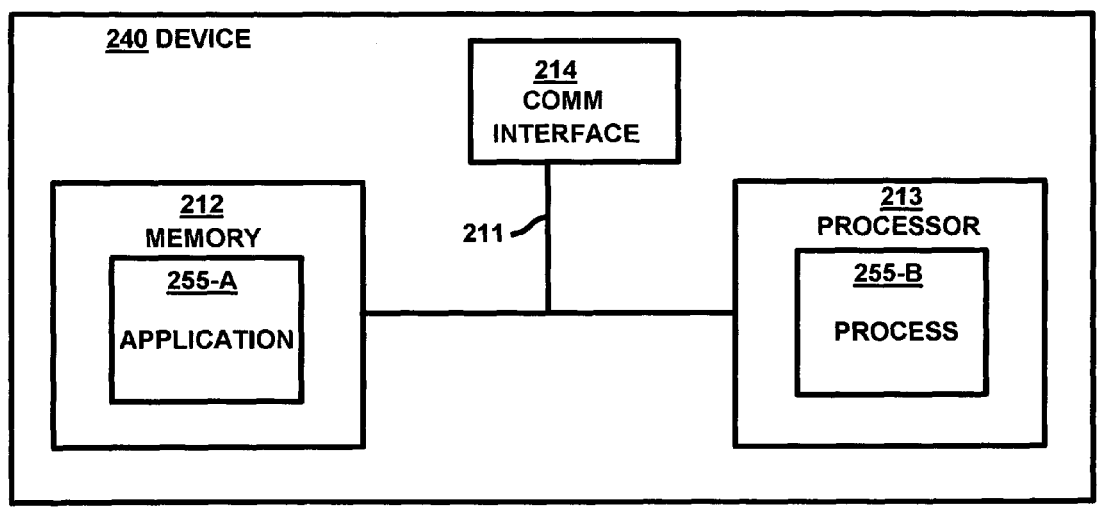
FIG. 3 illustrates an example computer system architecture for a computer system that performs determinations of wait treatment for a customer in a call center in accordance with certain embodiments of the invention.

FIG. 3 illustrates example architectures of a computer 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of determining wait treatment for a customer in a call center comprising:

recording information relating to a customer in a communication session with the call center, wherein said recording information relating to a customer in a communication session with the call center comprises recording the number of previous abandons by said customer;

evaluating the information relating to a customer in a communication session with the call center;

determining a type of wait treatment to use for said customer based on said evaluating the information relating to a customer in a communication session with the call center: and providing the determined type of wait treatment to said customer, evaluating the information relating to a customer in a communication session with the call center further comprising:

determining a proclivity of said customer to abandon a session while in wait treatment; and if determining a proclivity of said customer to abandon a session while in wait treatment results in said customer having a high proclivity, then engaging said customer in a contact during said wait treatment so that said customer is less likely to abandon said session.

2. The method of claim 1 wherein said determining a type of wait treatment comprises providing a wait treatment wherein said customer is engaged in a contact.

3. The method of claim 1 wherein said determining a type of wait treatment comprises providing a higher priority to said customer.

4. The method of claim 1 wherein said recording information relating to a customer in a communication session with the call center includes information recorded from at least one prior session with said customer.

5. The method of claim 1 further comprising purging said information after a predetermined period of time.

6. A non-transitory computer readable medium having computer readable code thereon for determining wait treatment for a customer in a call center, the medium comprising:

instructions for recording information relating to a customer in a communication session with the call center wherein said recording information relating to a customer in a communication session with the call center comprises recording the number of previous abandons by said customer;

instructions for evaluating the information relating to a customer in a communication session with the call center;

instructions for determining a type of wait treatment to use for said customer based on said evaluating the information relating to a customer in a communication session with the call center: and instructions for providing the determined type of wait treatment to said customer, recording information relating to a customer in a communication session with the call center including information recorded from at least one prior session with said customer.

7. The computer readable medium of claim 6 wherein said instructions for determining a type of wait treatment comprises instructions for providing a wait treatment wherein said customer is engaged in a contact.

8. The computer readable medium of claim 6 wherein said instructions for determining a type of wait treatment comprises instructions for providing a higher priority to said customer.

9. The computer readable medium of claim 6 further comprising instructions for purging said information after a predetermined period of time.

10. A computer system comprising:
a memory;
a processor;
a communications interface;
an interconnection mechanism coupling the memory, the processor and the communications interface; and
wherein the memory is encoded with an application for determining wait treatment for a customer in a call center that when performed on the processor, provides a process for processing information, the process causing the computer system to be capable of performing the operations of:

recording information relating to a customer in a communication session with the call center wherein said recording information relating to a customer in a communication session with the call center comprises recording the number of previous abandons by said customer;

evaluating the information relating to a customer in a communication session with the call center;

determining a type of wait treatment to use for said customer based on said evaluating the information relating to a customer in a communication session with the call center; and providing the determined type of wait treatment to said customer, evaluating the information relating to a customer in a communication session with the call center further comprising:

determining a proclivity of said customer to abandon a session while in wait treatment; and if determining a proclivity of said customer to abandon a session while in wait treatment results in said customer having a high proclivity, then engaging said customer in a contact during said wait treatment so that said customer is less likely to abandon said session.

11. The computer system of claim 10 wherein said determining a type of wait treatment comprises providing a wait treatment wherein said customer is engaged in a contact.

12. The computer system of claim 10 wherein said determining a type of wait treatment comprises providing a higher priority to said customer.

13. The computer system of claim 10 wherein said recording information relating to a customer in a communication session with the call center includes information recorded from at least one prior session with said customer.

14. The computer system of claim 10 further comprising purging said information after a predetermined period of time.

15. The computer readable medium of claim 6 wherein said instructions for evaluating the information relating to a customer in a communication session with the call center further comprises instructions for determining a proclivity of said customer to abandon a session while in wait treatment and wherein when said determining a proclivity of said customer to abandon a session while in wait treatment results in said customer having a high proclivity then engaging said customer in a contact during said wait treatment so that said customer is less likely to abandon said session.

16. The computer system of claim 10 wherein said evaluating the information relating to a customer in a communication session with the call center further comprises determining a proclivity of said customer to abandon a session while in wait treatment and wherein when said determining a proclivity of said customer to abandon a session while in wait treatment results in said customer having a high proclivity then engaging said customer in a contact during said wait treatment so that said customer is less likely to abandon said session.

* * * * *